Figure 1:
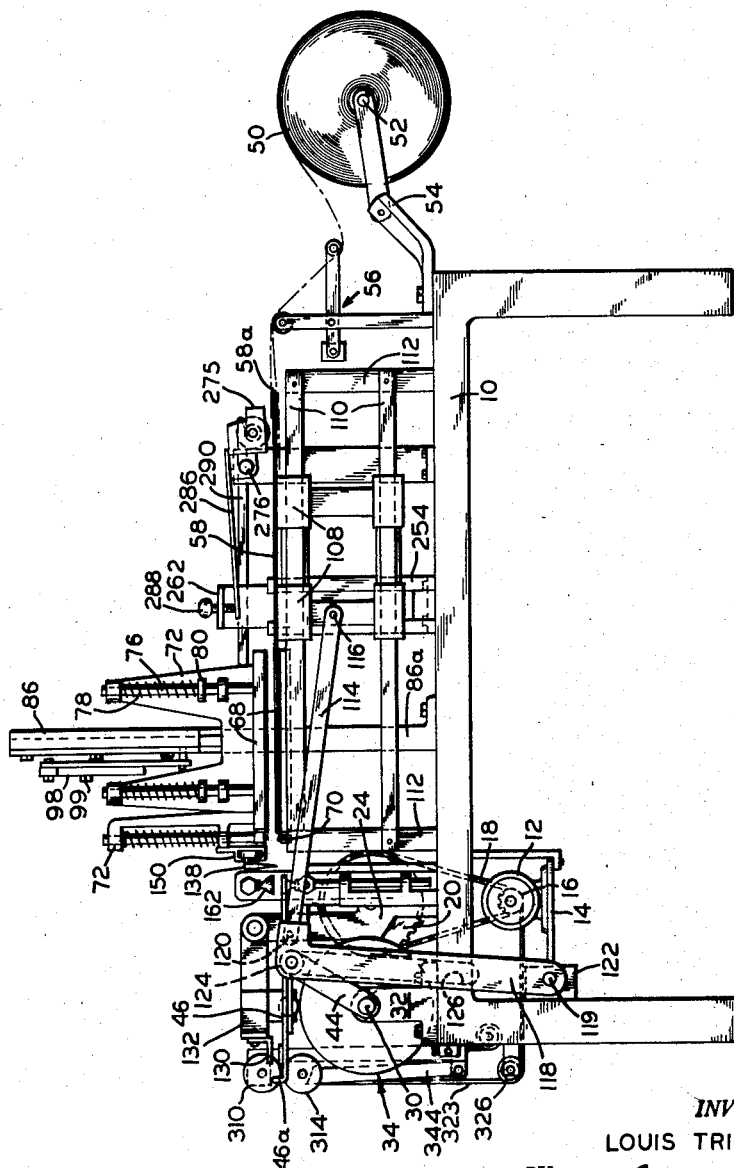

May 30, 1961  L. TRIOLO  2,986,079
ENVELOPE LINING MACHINE
Filed March 25, 1960  11 Sheets-Sheet 1

INVENTOR.
LOUIS TRIOLO
BY John P. Chandler
HIS ATTORNEY.

May 30, 1961
L. TRIOLO
2,986,079
ENVELOPE LINING MACHINE
Filed March 25, 1960
11 Sheets-Sheet 2
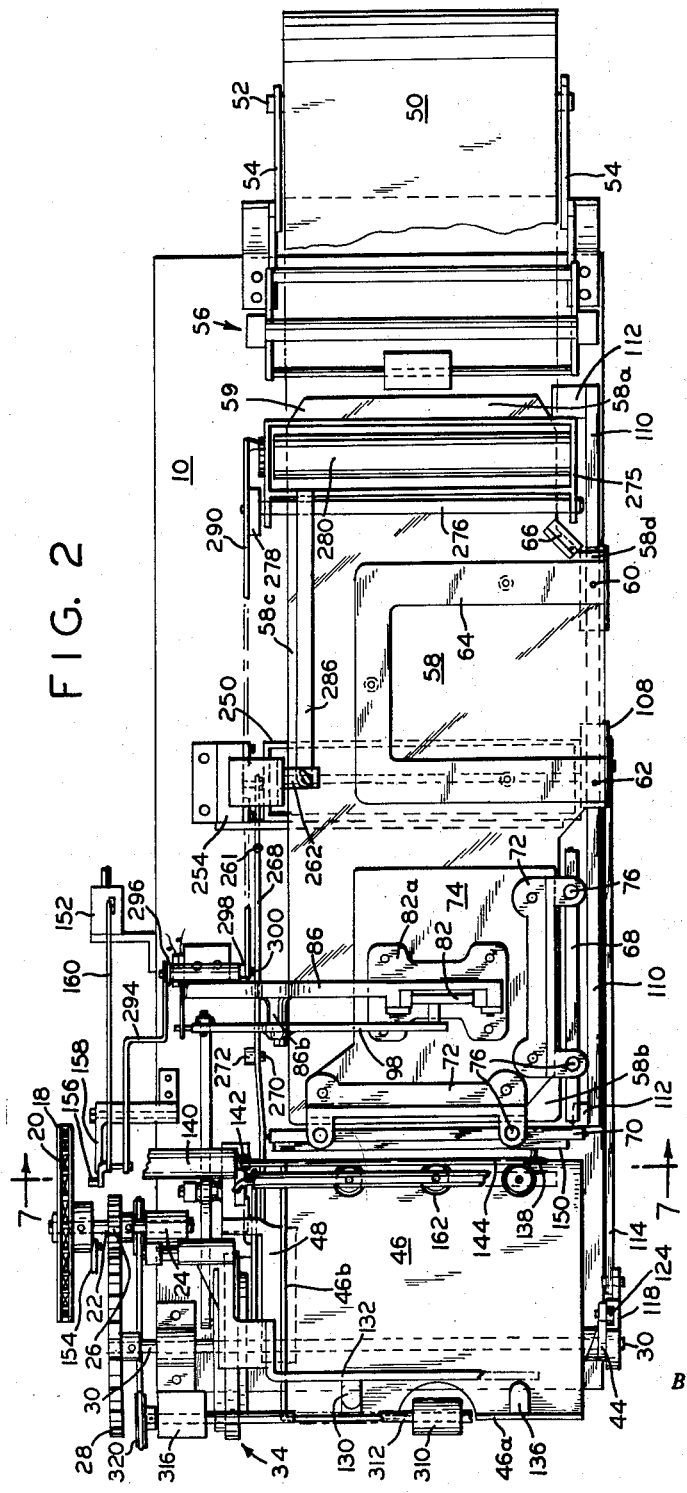
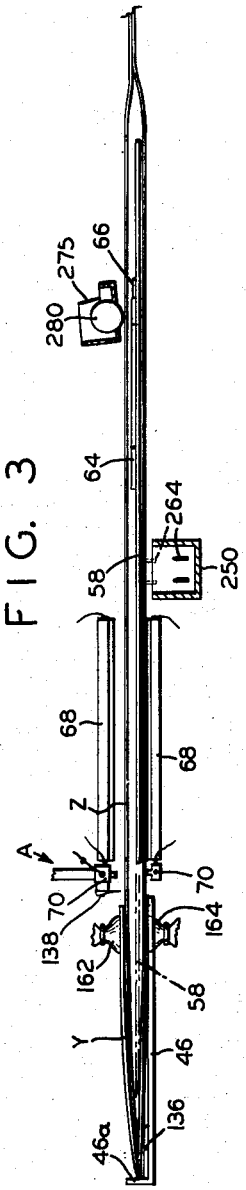
INVENTOR.
LOUIS TRIOLO
BY John P. Chandler
HIS ATTORNEY.

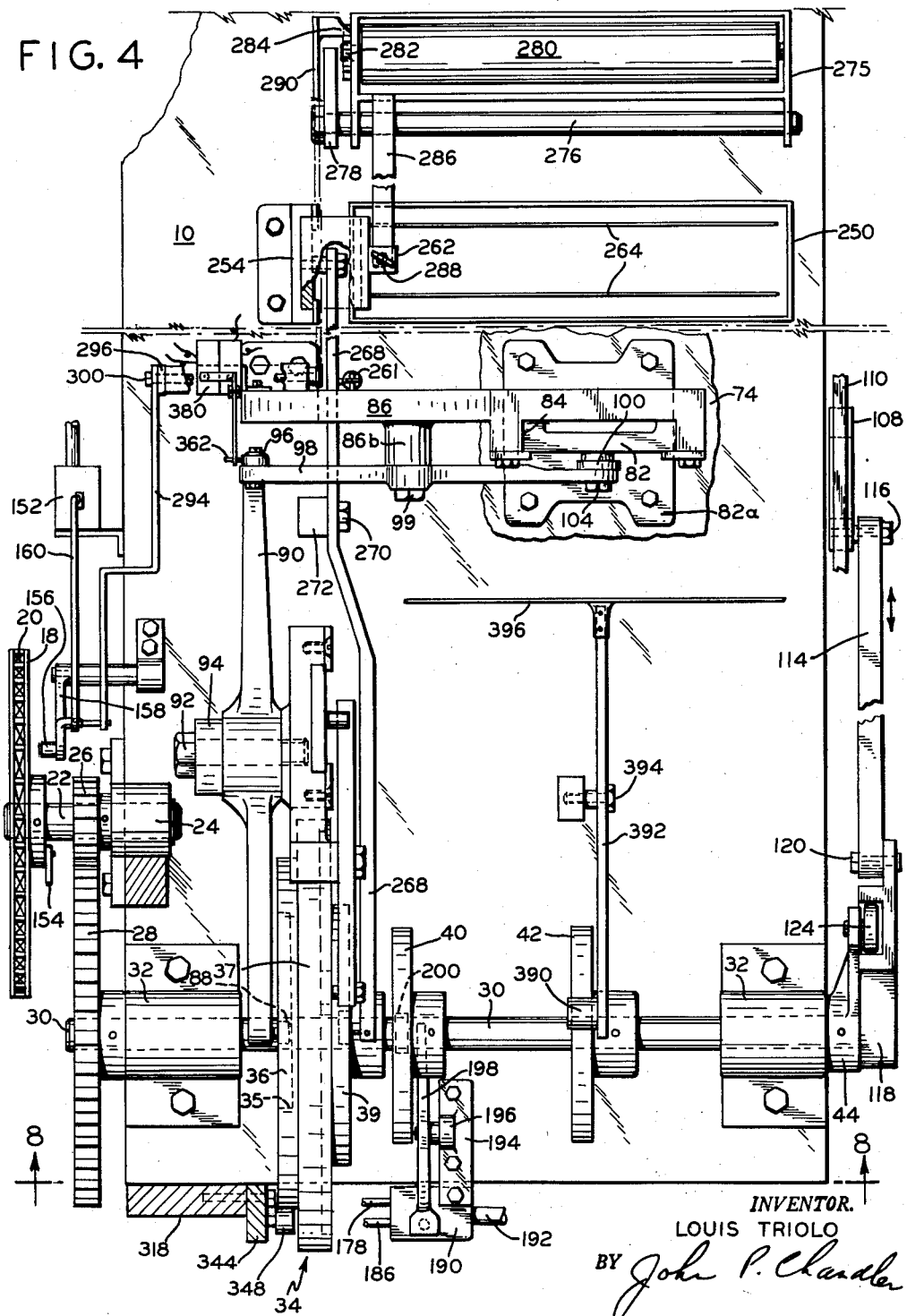

May 30, 1961  L. TRIOLO  2,986,079
ENVELOPE LINING MACHINE
Filed March 25, 1960  11 Sheets-Sheet 4

INVENTOR.
LOUIS TRIOLO
BY John P. Chandler
HIS ATTORNEY.

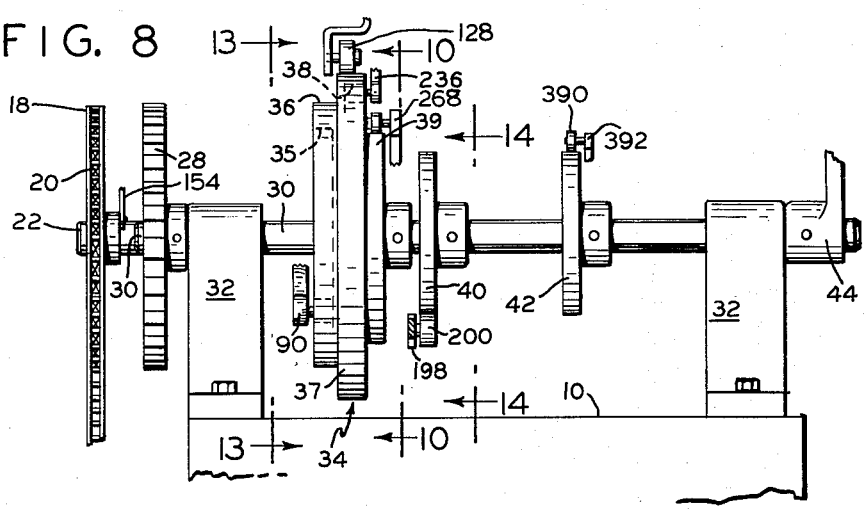

May 30, 1961

L. TRIOLO 2,986,079

ENVELOPE LINING MACHINE

Filed March 25, 1960

11 Sheets-Sheet 6

*INVENTOR.*
LOUIS TRIOLO
BY John P. Chandler
HIS ATTORNEY.

May 30, 1961 L. TRIOLO 2,986,079
ENVELOPE LINING MACHINE
Filed March 25, 1960 11 Sheets-Sheet 7

INVENTOR.
LOUIS TRIOLO
BY John P. Chandler
HIS ATTORNEY.

May 30, 1961  L. TRIOLO  2,986,079
ENVELOPE LINING MACHINE
Filed March 25, 1960  11 Sheets-Sheet 8

INVENTOR.
LOUIS TRIOLO
BY John P. Chandler
HIS ATTORNEY.

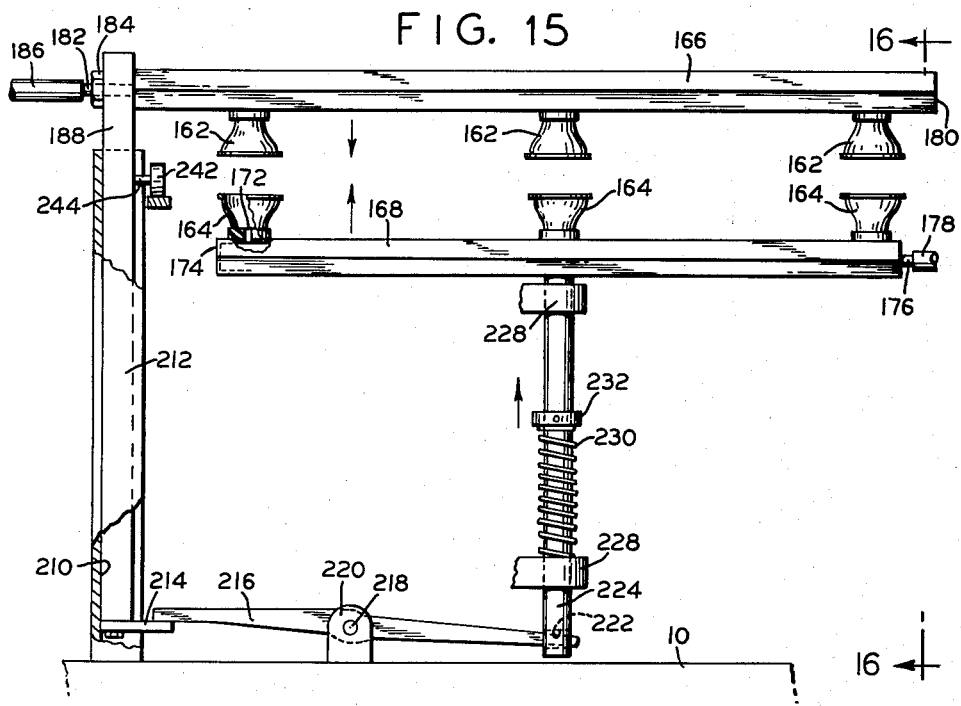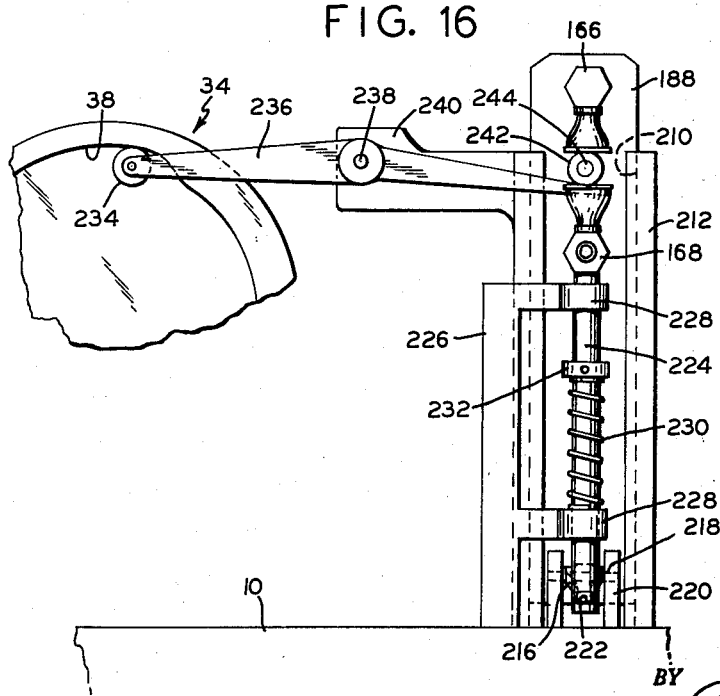

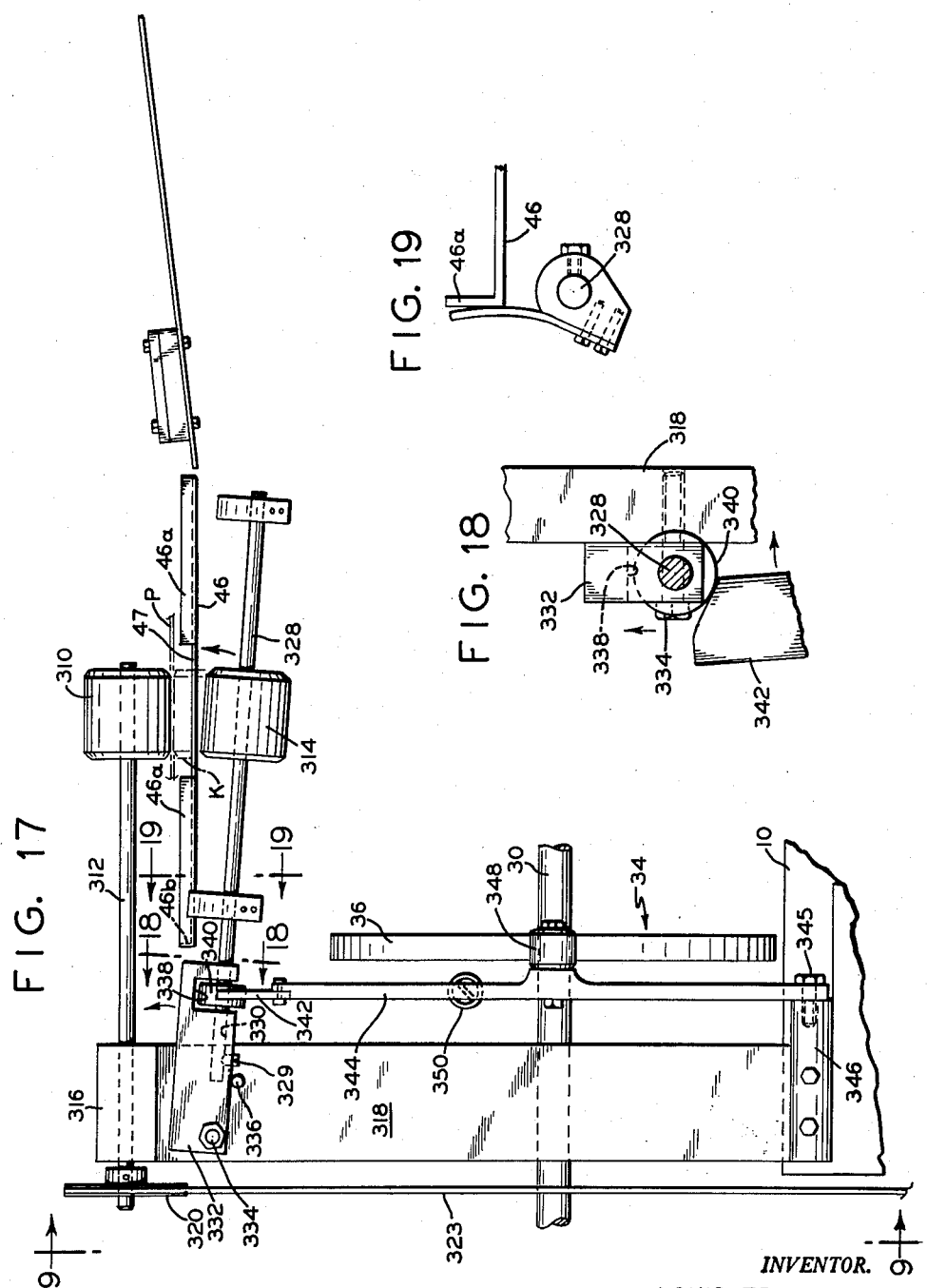

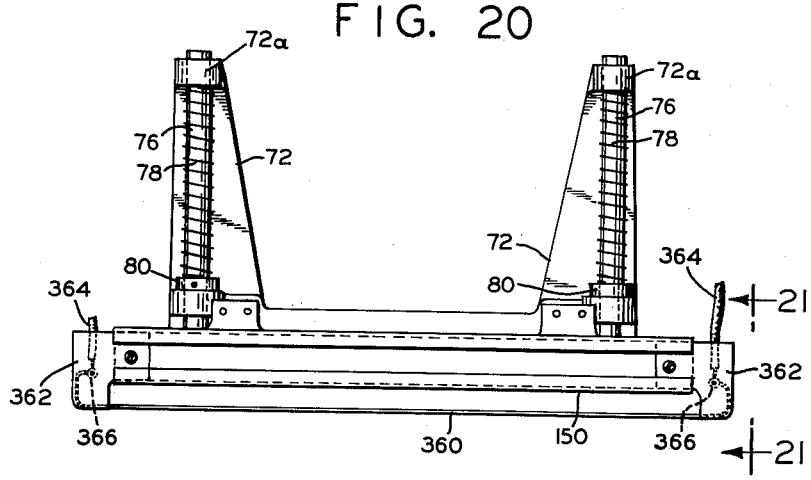
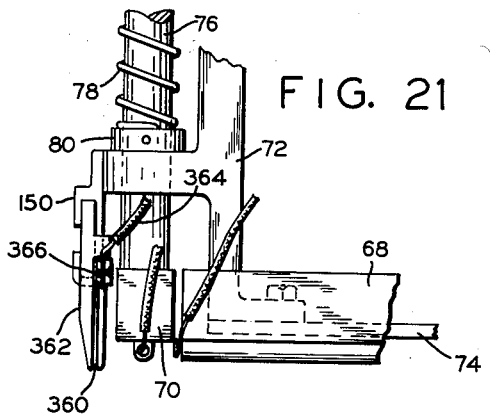

United States Patent Office 2,986,079
Patented May 30, 1961

2,986,079
ENVELOPE LINING MACHINE
Louis Triolo, 26 Bulwer Place, Brooklyn, N.Y.
Filed Mar. 25, 1960, Ser. No. 17,559
15 Claims. (Cl. 93—61)

This invention relates to container lining machines and more particularly to an envelope lining machine for forming and inserting a lining into a preformed envelope.

An object of the present invention is to provide a machine for inserting plastic linings into preformed cardboard envelopes thereby facilitating the operation which is normally a slow and trying manual operation.

Another object is to provide a machine which forms the linings from a continuous roll of thin tubular plastic material and then inserts them into preformed envelopes which are fed into the machine.

A further object of the invention is to provide a machine which forms the linings, applies an adhesive thereto, and then inserts them into preformed envelopes thus permanently bonding the lining within the envelope.

Yet another object of the invention is to provide in a machine of the character described, a novel feeder plate mounted at one or two points along a longitudinal edge between the ends of said edge, on a reciprocating carriage over which the tubular plastic material is threaded. The forward edge of the tube is heat sealed to form an abutment against which the feeder plate pushes in order to move the liner element into the envelope while the upper and lower walls of the latter are held open by vacuum cups.

Because of the necessity for attaching the feeder plate to the carriage and because the tubular liner material is easier to handle than sheet material having a longitudinal median fold line, the tube must be slit along one edge therof, and it is promptly resealed after it passes this point of attachment and before it is moved into the envelope which is supported on a fixed platen or platform aligned with the feeder plate. If the flat materiatl with the longitudinal fold line is used, the slitting knife may be omitted.

The invention will be best understood from a consideration of the following detailed description taken in connection with the accompanying drawings forming a part of this spectification, with the understanding, however, that the invention is not confined to any strict conformity with the showing of the drawings but may be changed or modified so long as such changes or modifications mark no material departure from the salient features of the invention as expressed in the appended claims.

Figure 5:
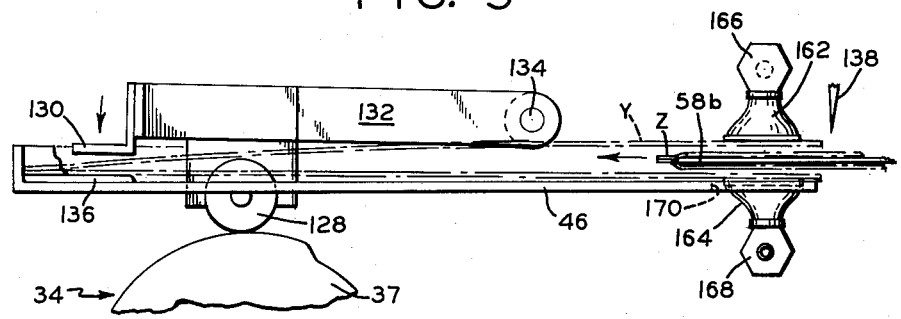
Figure 6:
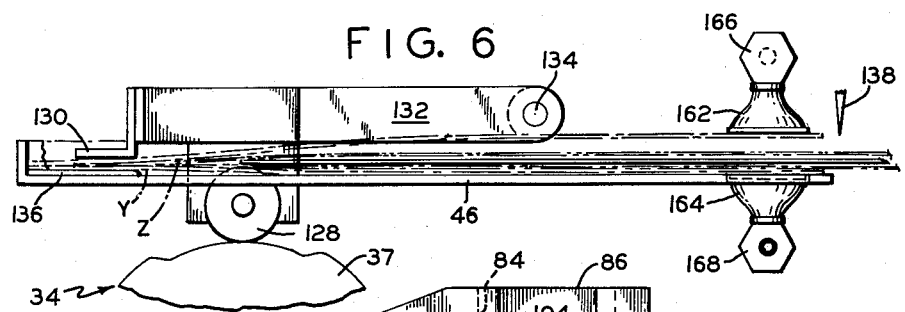
Figure 7:
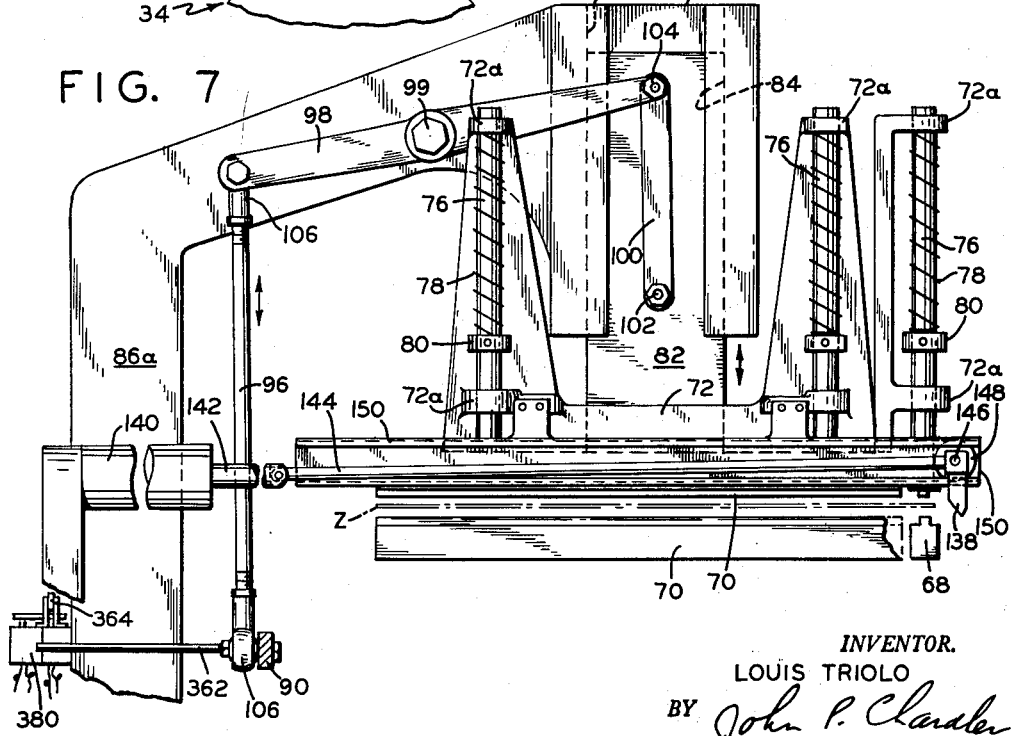
Figure 10:
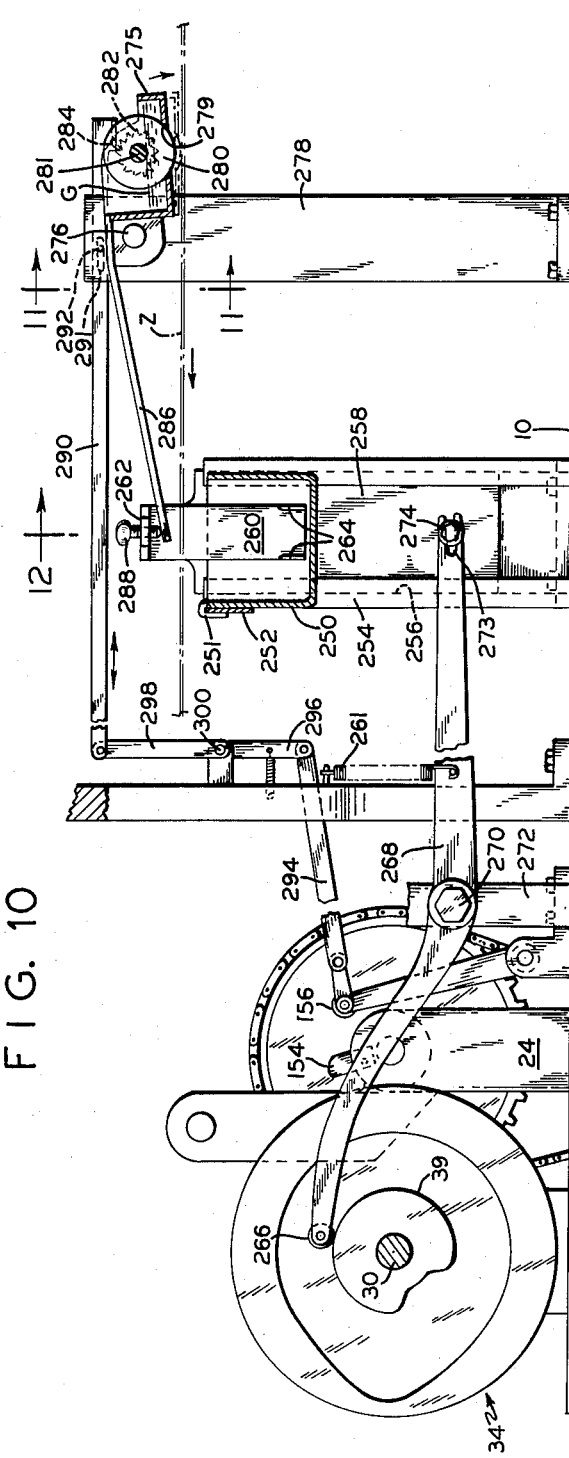
Figure 11:
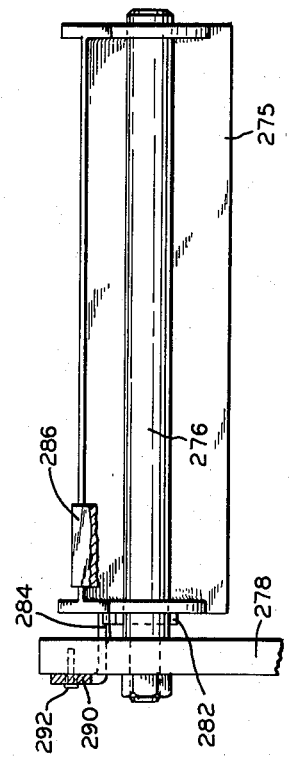
Figure 12:
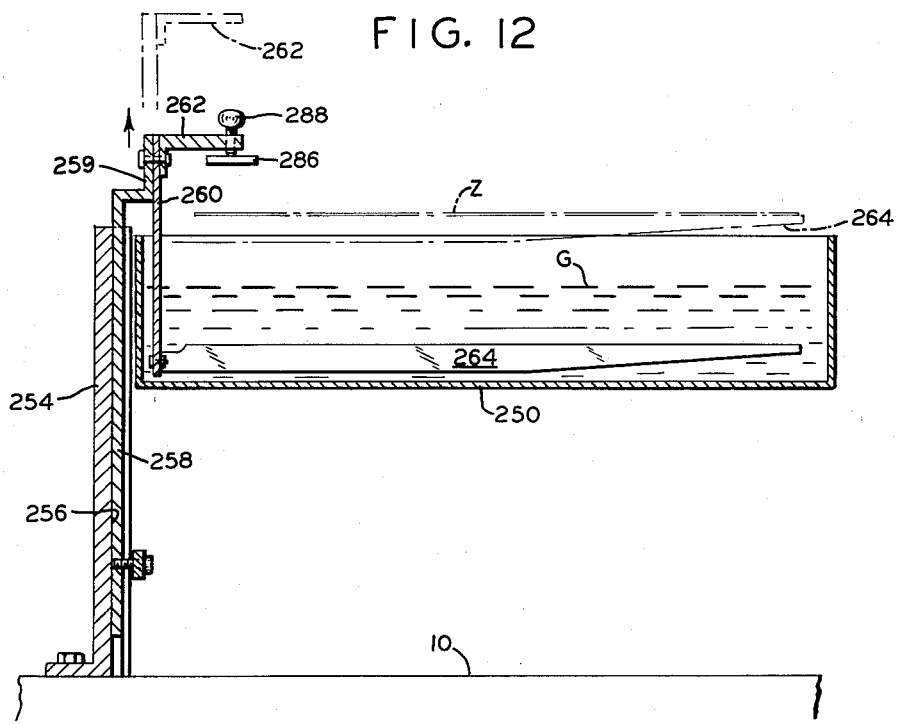
Figure 22:
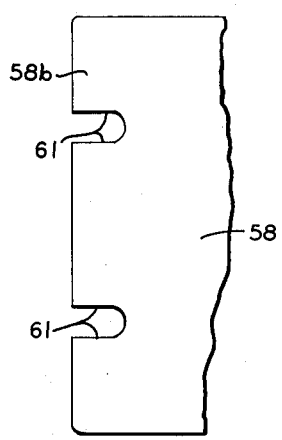
Figure 13:
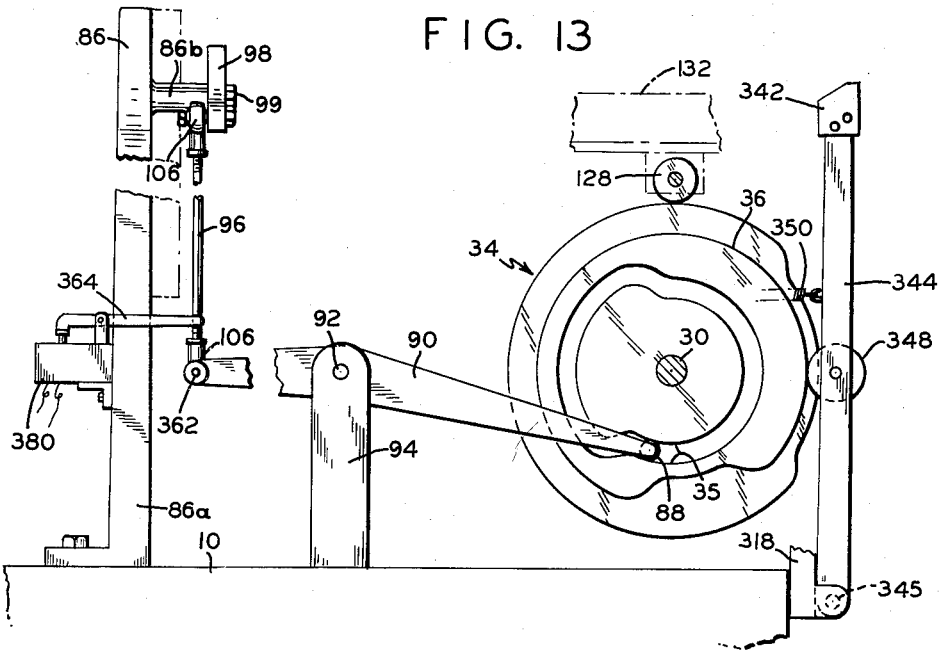
Figure 14:
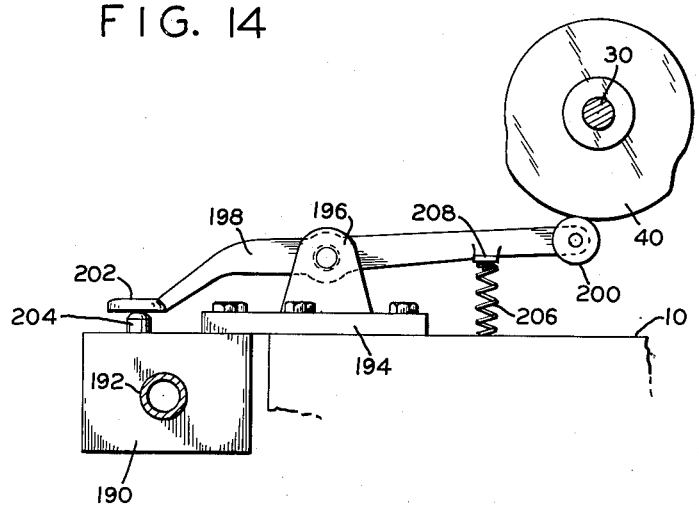

In the drawings:
Fig. 1 is a side elevation of the machine.
Fig. 2 is a plan view of the machine.
Fig. 3 is a schematic side view similar to Fig. 1.
Fig. 4 is a plan view of the driving mechanism and cams.
Fig. 5 is a side elevation showing the envelope opening and clamping mechanism.
Fig. 6 is a view similar to Fig. 5 showing the clamping mechanism in clamped position.
Fig. 7 is a view in elevation taken along line 7—7 of Fig. 2.
Fig. 8 is a view taken along line 8—8 of Fig. 4.
Fig. 9 is a view taken along line 9—9 of Fig. 17.
Fig. 10 is a view taken along line 10—10 of Fig. 8.
Fig. 11 is a view taken along line 11—11 of Fig. 10.
Fig. 12 is a view taken along line 12—12 of Fig. 10.
Fig. 13 is a view taken along line 13—13 of Fig. 8.
Fig. 14 is a view taken along line 14—14 of Fig. 8.
Fig. 15 is an elevational view of the envelope opening mechanism.
Fig. 16 is a view along line 16—16 of Fig. 15.
Fig. 17 is an elevational view of the ejector mechanism.
Fig. 18 is a view along line 18—18 of Fig. 17.
Fig. 19 is a view along line 19—19 of Fig. 17.
Fig. 20 is a view similar to Fig. 7 showing an alternate cut-off mechanism.
Fig. 21 is a view taken along line 21—21 of Fig. 20.
Fig. 22 is a plan view of the forward end of the feeder plate.

Referring now to Figs. 1 through 14, a table 10 supports the various mechanisms in proper coacting relationship. The motive power is derived from an electric motor 12 supported upon a shelf 14 attached below the table 10. The shaft 13 of the motor 12 has a sprocket 16 attached thereto which drives another sprocket 20 through a chain 18. The sprocket 20 is secured upon a shaft 22 which is journalled in a support 24 mounted upon the table 10. A spur gear 26 is pinned to the shaft 22 and meshes with a second spur gear 28 through which power is transmitted to a cam shaft 30. There are two bearings 32 mounted upon the table 10 which rotatably support the cam shaft 30 as best shown by Figs. 4 and 8. The cam shaft 30 supports the cams which are properly arranged and timed to initiate the various movements required. A multiple cam generally indicated 34 comprises five operating contours, 35, 36, 37, 38 and 39, the functions of which will be described more fully hereafter. Also mounted upon the cam shaft 30 are cams 40 and 42 and a crank 44, the purposes of which will be set forth below. A table 46 is supported by a bracket 48 above the cams as best shown in Figs. 1 and 2. At the opposite end of the table 10 a roll of plastic liner material 50 is rotatably mounted upon a shaft 52 and held between two adjustable brackets 54 which are secured to the end of the table 10. A counter balance arrangement generally indicated 56 is fastened to the table 10 before the roll 50 to take up the slack in the material as it is fed into the machine. A feeder plate 58 of very thin but rigid material has three free sides and is attached at its fourth side at points 60 and 62. A yoke 64, also of thin rigid material, helps to properly support and carry the feeder plate 58 to which it is attached in face-to-face relation (Fig. 2).

The plastic lining material is a stock item and comprises a thin flexible tubing which is flattened when wound upon the roll 50. As the tubing is drawn from the roll the end 58a of the feeder plate 58 moves into the flattened tubing and the tubing is drawn to the front end 58b of the plate 58 to substantially enclose it. The opposed ends of edge 58a are chamfered at 59 to facilitate entry of the tube. It will be noted that since the side 58c of the plate 58 is free, the tubing can pass from end 58a to end 58b unencumbered, but since the plate 58 is attached and supported at 60 and 62 on its side 58d it would be impossible for the tubing to pass this point. For this reason a thin cutting blade 66 is positioned at this point which cuts the tubing allowing it to pass over the plate 58 as described above. At the forward end 58b of the plate a pair of heat sealing elements 68 close upon the tubing in proper timed sequence to seal the side of the tubing which was cut by blade 66. When the tubing is drawn through the machine from the roll 50 its end is positioned sufficiently beyond the end 58b of the plate to rest between a second pair of heat sealing elements 70 which close to seal the tubing laterally at the same time as the elements 68 are sealing the cut side of the tubing. The coincident timing is accomplished by securing two brackets 72, in which the upper elements 68 and 70 are carried, upon a vertically movable platform 74. The lower elements 68 and 70 are stationary, being mounted upon brackets extending from the table 10 and positioned directly beneath the path of travel of the tubing, as best shown by Fig. 3. The upper elements 68 and 70 are fastened to rods 76 which are slidably mounted in bosses 72a in the brackets 72. Springs 78 which surround each of the rods 76 press against collars 80 secured to each of the rods to afford vertical resilience and accommodate over travel of the platform 74. This is best shown by Fig. 7. A beam 82 is constrained within ways 84 for vertical movement. The beam 82 is flanged at its base as indicated at 82a where the platform 74 is attached. The ways 84 are formed in an arm 86 which overhangs the plastic tubing Z substantially in the center thereof. A depending portion 86a of the arm 86 is secured to the table 10. The vertical motion of the beam 82 and consequently the heat sealing elements 68 and 70 is derived from the cam surfaces 35 of the multiple cam 34 as best seen in Fig. 13. A follower 88 cooperates in cam 35 to operate a lever 90 pivoting at 92 in a supporting member 94 which is secured to the table 10. A connecting rod 96 is attached to the free end of lever 90 for operating a second lever 98 which pivots at a point 99 in a boss 86b on the arm 86. The lever 98 imparts vertical movement to the beam 82 through a link 100 which pivotally attaches at 102 to the beam and at 104 to the end of the lever 98. It will be noted that ball and socket joints 106 are used at the connecting points between the rod 96 and the levers 98 and 90 to accommodate the radial movement of the said levers.

After the heat sealing operation upon the plastic tubing Z, as described above, the forward end 58b of the feeder plate 58 pushes against the now sealed edge of the plastic tubing moving it into an envelope Y which has been placed in position upon the table 46, as best shown by Figs. 3, 5, and 6. The feeder plate 58 derives its motion by virtue of the fact that its fastening points 60 and 62 are part of a carriage 108 which is slidably mounted upon two rails 110. The rails are longitudinally fastened to two upright members 112 which are secured to the table 10. A connecting rod 114 is attached at 116 to the carriage 108 and the free end of the connecting rod attaches at 120 to an oscillating arm 118 which is pivotally mounted at 119 in a bearing 122. The crank 44, which is rotatably driven by the shaft 30, has a roller bearing 124 attached to its free end. This bearing operates within a channel 126 in the oscillating arm 118 to drive the arm in an oscillating manner as the crank 44 rotates. This motion thus imparts, through the connecting rod 114, reciprocating motion to the carriage 108.

When the feeder plate 58 has pushed the plastic tubing into the envelope, as described above, it then returns to its original position as shown in Figs. 1 and 2, due to the reciprocating carriage 108 just described. In order to prevent the returning feeder plate 58 from carrying back the plastic tubing with it, a clamp 130 comes into play actuated by the cam surface 37 of the multiple cam 34 coacting with a cam follower 128 mounted upon an arm 132 to which the clamp 130 is attached. The arm 132 pivots about a shaft 134 mounted in the bracket 24 as shown by Figs. 2, 5, and 6. The clamp 130, when actuated by the cam follower 128, presses the envelope Y together with the plastic tube lining against a pad 136 on the table 46 with sufficient pressure to permit the feeder plate 58 to be withdrawn without carrying the lining with it. To prevent the feeder plate from being clamped together with the envelope and tubular lining, two openings 61 are formed in the feeder plate to clear the pad 136 and clamp 130 as shown in Fig. 22.

After the feeder plate 58 has returned to its initial position, as described above, the platform 74 moves downwardly in order that the heat sealers 68 and 70 seal off the new portion of the plastic tubing which has been brought into this position by the action of the feeder plate 58 in pushing the formerly sealed edge into the envelope upon the table 46. At the same instant that the sealers are acting upon the tubing Z, a knife blade 138 is drawn across the tubing Z thus severing the portion which has been inserted in the envelope. This is best shown in Fig. 7. An air cylinder 140 is the motive power for operating the knife 138 which is connected to the shaft 142 of the air cylinder 140 through a rod 144. The knife 138 is supported for movement upon the shaft 146 of a roller 148 which travels within a channel-shaped track 150 bridging across the tubing. The air cylinder receives air from a supply (not shown) through a valve 152 (Figs. 2 and 4) which is operated by a cam segment 154 attached to the hub of the gear 20. A cam follower 146 which is attached to a lever arm 158 cooperates with the cam segment 154 to transmit motion through a connecting rod 160 to operate the valve 152. After the knife 138 severs the tubing Z, the envelope Y, with assembled lining therewithin, is ready to be ejected in a manner to be described below.

Returning now to the original position of the feeder plate 58, the tubing has been sealed and is ready to be pushed into the envelope Y by the feeder plate. It will be understood that the envelope is the type comprising a top and bottom with three sides closed and one side open, and is inserted upon the table 46 in such manner that the open side faces the feeder plate, ready to have the tubular lining inserted. For the positive functioning of this operation the open end of the envelope is held in sufficiently wide position to receive the feeder plate by a set of three upper suction cups 162 and a set of three lower suction cups 164, the upper set holding the top of the envelope and the lower set holding the bottom of the envelope, as best shown in Figs. 5 and 6. The operating mechanism is best shown in Figs. 15 and 16 wherein the upper suction cups 162 depend below a hexagonal tube 166 and the lower suction cups project above a second hexagonal tube 168 in such manner that the open ends of the upper and lower cups face each other. The lower cups 164 project through openings 170 in the table 46. Each of the suction cups 162 and 164 is provided with an opening 172 connecting the inside of the cup with the inside of the hexagonal tube. The tube 168 has a closed end 174 and the free end has a projecting circular tube 176 to which a flexible tube 178 is attached. The tube 166 also has one closed end 180 and a circular tube 182 projecting from the free end thereof. The tube 182 is threaded on its outside surface to accommodate a nut 184 for securely mounting the tube 166 upon a vertically movable slide 188 as shown in Fig. 15. A second flexible tube 186 is attached to the tube 182 and terminates at a valve 190 (Fig. 14) where tube 178 also terminates. The valve is also provided with an exhaust tube 192 which connects with an air exhausting device (not shown). A bracket 194 which is secured to the table 10 supports the valve 190 and also is provided with a boss 196 for pivotally carrying a lever 198. A cam follower 200 is attached to one end of the lever 198 to cooperate with the cam 40 to operate the valve 190 in proper sequence timing. The free end of the lever 198 is provided with a foot 202 which actuates a button 204 to operate the valve 190. A spring 206 pressing against an ear 208 on the lever 198 urges the cam follower 200 to contact with the cam 40. The slide 188 is received for vertical movement within a channel-like opening 210 in a housing 212. A plate 214 is attached to the bottom of the slide 188 and cooperates with the end of a lever 216 which pivots about a point 218 in a bracket 220 secured to the table 10. The free end of the lever 216 projects into a slot 222 at the lower end of a rod 224 for the purpose of coacting with the rod. The hexagonal tube 168 is secured to the upper end of the rod 224. A bracket 226 is secured to the table 10 and is provided with bosses 228 in which the rod 224 is supported for vertical movement. A spring 230 surrounding the rod 224 presses against a collar 232 which is pinned to the rod thereby urging it upwardly. It will be noted here that the arrangement of coacting elements is such that when the rod 224 moves upwardly the slide 188 moves downwardly thus bringing the upper suction cups 162 towards the lower suction cups 164, and of course the reverse movement also follows. This motion is derived by the action of the cam surface 38 which cooperates with a cam follower 234 and thus imparts motion to a lever 236 on which the follower 234 is mounted. The lever 236 is pivotally mounted at 238 upon an arm 240 projecting from the housing 212 as best shown in Fig. 16. The free end of the lever 236 presses against the lower circumference of a roller 242 which is mounted on a pin 244 projecting from the side of the slide 188 in such manner as to move the slide upwardly upon following the contour of the cam 38. The spring 230 aids gravity in moving the slide 188 downwardly when the cam 38 becomes positioned so as to allow the lever 236 to drop beneath the roller 242.

In order to securely and permanently assemble the plastic tubing liner within the envelope it is found desirable to apply glue or a suitable adhesive to the top and bottom outside surfaces of the tubing, before inserting the envelope. This is accomplished by applying a narrow strip or line of adhesive laterally across the tubing. With this purpose in view, an adhesive container 250 (Fig. 10) is mounted by ears 251 upon a laterally extending arm 252, positioned below the path of travel of the plastic tubing Z. The arm 252 is secured upon a vertical mount 254 which in turn is secured to the table 10. This vertical mount is provided with a grooved portion 256 which receives a slide 258 for vertical movement therewithin. The upper end of the slide is provided with a stepped section 259 to which is secured a depending plate 260 and an overhanging plate 262. The depending plate 260 carries at its lower end two blades 264 which are normally submerged in a liquid adhesive material G within the container 250. It will readily be seen that when the slide 258 moves upwardly the blades 264 will strike the tubing Z depositing thereon some of the adhesive carried from the container 250. The use of two blades 264 properly spaced apart makes it possible to mark two lines of adhesive, one of which will become the top edge of one lining and the other will become the bottom edge of the next lining, thus requiring only half the number of vertical movements of the slide 258 as would otherwise be necessary.

The slide 258 derives its motion from the cam 39 of the multiple cam 34 and follower 266 which is mounted upon one end of a lever 268. This lever, pivoting at 270 in a bracket 272, has a slot 273 at its free end in which a pin 274, projecting from the slide 258, cooperates to move the slide vertically. Spring 261 urges lever arm 268 in a direction to cause follower 266 to cooperate with cam 39. A second adhesive container 275 is pivotally mounted on a shaft 276 projecting from a bracket 278 which is secured to the table 10. The container 275 has an opening 279 in the bottom which is substantially filled by a roller 280. The roller is, furthermore, mounted for rotation on a shaft 281 between the ends of the container 275. A ratchet 282 is attached to one end of the shaft 281 and is driven by a pawl 284 in substantially a continuous manner. The container 275 holds a supply of adhesive G similar to that in container 250. It will become apparent that inasmuch as the roller 280 is continuously rotating its periphery will be constantly wet with liquid adhesive G and particularly the part of the roller that projects below the bottom of the container 275. This is important to note in order to understand that when the container 275 is rotated slightly in a clockwise manner about the shaft 276 the roller 280 drops into contact with the tubing Z thus transferring some of the adhesive onto the tubing. The container 275 is restrained from rotation by an arm 286 projecting therefrom to a point beneath an adjusting screw 288 in the plate 262. It will now become readily apparent that as the slide 258 moves upwardly carrying plate 262 and screw 288, the arm 286 is allowed to move upwardly and the container 275 with roller 280 due to gravity will drop against the tubing Z.

The pawl 284 is mounted upon the end of a reciprocating bar 290 which is provided with a slot 291 to receive a pin 292 for slidably attaching the bar to the bracket 278. The bar 290 is driven by the action of the cam segment 154 and follower 156 through a connecting link 294, lever arms 296 and 298 both of which are secured upon a shaft 300.

After the lining has been inserted in the envelope and severed, the assembled product is ready to be ejected from the machine. Referring now to Figs. 1, 9, 17, 18 and 19, an upper driving roller 310 is mounted upon a shaft 312 and positioned substantially central and slightly above the table 46. An opening 47 is cut out of the table 46 at this point to allow a lower cooperating roller 314 to be moved upwardly into contact with the driving roller 310. The shaft 312 is journaled in a bearing 316 in a bracket 318 which is attached to the table 10. A pulley 320 is secured to the shaft 312 and is continuously driven from a pulley 322 on the motor shaft 13 by a belt 323 which passes around idler pulleys 324 and 326. The roller 314 is rotatably mounted upon a shaft 328 and positioned directly below the roller 310. The shaft 328 is inserted into a hole 330 in a bar 332 and fastened by a set screw 329. The bar is rotatably mounted upon a stud 334 projecting from the bracket 323 and limited against rotation by a pin 336. The bar 332 is provided with an inverted U-shaped slot 338 to receive a cam follower 340 which is rotatably attached to the shaft 328. A cam plate 342 coacts with the follower 340 to raise the shaft 328 into operating position parallel to the shaft 312. The cam plate is carried upon the upper end of a lever 344 which is pivotally attached by a screw 345 to a boss 346 projecting from the bracket 318. Another cam follower 348 is rotatably attached to the lever 344 and cooperates with the cam 36 of the multiple cam 34. A tension spring 350 which is fastened at one end to the lever 344 holds the follower 348 against the cam surface 36. Two guide members 352 which are secured to the shaft 328 serve to insure proper vertical movement of the shaft 328 and consequently roller 314. This is best illustrated in Fig. 19.

An alternate method of severing the plastic tubing is illustrated by Figs. 20 and 21, wherein the knife 138 is replaced by a heated electric wire 360 which is stretched between two insulating blocks 362. These blocks are fastened to the opposite ends of the knife track 150 and lead wires 364 connect to the terminal points 366 of the heated wire 360. The track 150 is attached to the bracket 72 for vertical movement therewith, as described above.

The operation of the machine is initiated by inserting a roll 50 of tubular plastic lining material and threading the free end through the counter balance 56 and over the feeder plate 58, one side of the tubing being slit by blade 66 as it passes, to the heat sealing station A (Fig. 3). The machine is then started by starting the electric motor 12 which drives the cam shaft 30 through the sprocket 16, chain 18, sprocket 20, shaft 22, spur gears 26 and 28. The multiple cam 34 on the shaft 30 actuates the lever 90 which in turn operates the lever 98 through rod 96 and lowers the platform 74 together with the heat sealers 68 and 70. As the end of the arm 90 moves upwardly a pin 362 which protrudes from the arm 90 actuates a microswitch lever 364 to energize the heat sealers 68 and 70 which immediately seals the end of the plastic tubing and the side which was cut. This operation is followed by the operation of the knife 138 which at the initial starting of the machine does not cut anything since the tubing has not yet been carried across the path of the knife.

The platform 74 is now raised, due to the continuing action of the cam 34, which removes the pressure of the heat sealers 68, 70, from the tubing, leaving it free for movement.

The feeder plate 58 now begins to move, pushing against the sealed end of the plastic tubing thereby moving it into a position above the table 46. This motion of the plate 58 is derived from the crank 44 on the shaft 30 coacting with the oscillating arm 118 and connecting rod 114 to move the carriage 108 along the rails 110, the plate 58 being attached to the carriage 108.

After the plate with plastic tubing has arrived at the position over table 46, as described above, the action of the cam 37 and follower 128 drops the clamps 130 upon the pads 136 clamping the tubing therebetween. Thus the tubing is held while the feeder plate 58 is withdrawn to its initial position. The cycle now starts again with the heat sealers 68 and 70 descending upon the tubing and sealing the tubing across laterally and the open side and the knife 138 then severs the tubing adjacent the heat sealed portion thereof, as described above. The pressure of the heat sealers at one point and the clamps 130 hold the tubing sufficiently taut for the operation of the knife which is driven by the air cylinder 140 in proper timing arrangement by the cam 154, follower 156 and lever 160 which actuates the air valve 152.

While the knife is returning to "home" position the severed lining is ejected from the table 46 by the coacting rollers 310 and 314. It will be noted, by referring to Figs. 2 and 17, that these rollers are positioned above and below, respectively, an opening 47 in the table 46. It will be further understood that the item to be ejected (the lining) is nested upon the table 46 behind the sides 46a and extending across the opening 47 between the rollers 310 and 314. It will be recalled that the roller 310 is constantly rotating and that the roller 314, and shaft 328, are movable about pivot point 334. The action of the spring 350 in cooperation with the cam 36 and follower 348 forces the cam plate 342 acting against roller 340 to raise the shaft 328 and roller 314 into ejecting position against the roller 310. It will be observed, however, that while the roller 314 is moving upwardly it first contacts the item to be ejected (item P, Fig. 17), raising that also into contact with the rotating roller 310 where it is swiftly ejected. In this particular instance the item ejected is the plastic lining which is the first one out of the machine after threading and initially starting the machine. During the threading operation the machine, of course, is not running and therefore the initial lining will not have received any adhesive and therefore is discarded.

Now, however, an envelope is placed upon the table 46 in a manner nesting against sides 46b and ends 46a. The upper and lower suction cups 162 and 164, respectively, are brought together upon the top and bottom of the envelope Y, Fig. 3, by the action of cam 38, follower 234 and lever 236. The air is then exhausted from the suction cups through tubes 178 and 186 connected to the valve 190, thence through tube 192 to an air exhausting device (not shown). The cam 40, follower 200, and lever 198 control the sequence operation of the air exhausting operation. The suction cups are then moved apart again by means of cam 38, thereby holding the top and bottom of the envelope apart. While in this position, the feeder plate 58 moves into the envelope carrying the plastic tube. The clamp 130 then holds the tube within the envelope, as described above, while the feeder plate 58 withdraws. The heat sealers again descend to clamp and seal the tubing while the knife cuts it, as described above.

During the travel of the plastic tubing from the roll 50 through the machine, it passes beneath an upper adhesive container 275 and above a lower adhesive container 250, as seen in Fig. 10. The action of cam 39, follower 266, and lever 268, intermittently raises knives 264 to deposit adhesive on one side of the plastic tube and at the same time, through the coaction of arm 286, lowers the adhesive laden roller 280 to deposit adhesive upon the opposite side of the tube. Thus, when the tube has become lined within the envelope, the adhesive bonds it permanently therein.

A cam 42 and follower 390 and lever 392 pivoting at 394 cooperate to raise an arm 396 upwardly adjacent the plastic tubing to hold the tubing clear of the heat sealing elements while it is moving in order to prevent wiping the adhesive on the tubing upon the heat sealers.

The assembled envelope with lining is ejected from between the rollers 310 and 314 as described above.

An alternate cutting device can be used in place of the knife 138. This is an electrically heated wire 360, Figs. 20 and 21, which is positioned upon the brackets 72 adjacent the heat sealing device similarly to the knife. A second micro switch 380 (Fig. 7) is operated by the pin 362 to energize the wire 360 which instantly becomes so hot as to practically melt its way through the plastic tubing.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A machine for lining an envelope having an opening along an edge thereof and comprising a frame, a platen for supporting said envelope to receive a liner through said open end, a cam shaft journalled in the frame for driving moving parts of the machine and provided with cams and arms therefor, upper and lower vacuum elements adjacent the platen for opening the envelope to receive the liner, means for supporting a web of liner material having a central longitudinal fold line, a reciprocating carriage on the frame and a feeder plate attached at a point along one edge intermediate its ends to said carriage to receive the liner material and push its leading edge into the envelope, means for joining the layers of said leading edge to form an abutment for the feeder plate to operate against, a cutter for severing a liner from the web after it has entered the envelope, and means for applying adhesive to the forward and rear ends of a liner material before it is moved into the envelope and cut from the web.

2. The machine defined in claim 1 wherein heat-sealing means are employed for joining the layers of the leading edge.

3. The machine defined in claim 1 wherein means are provided for ejecting the lined envelopes from the platen.

4. The machine defined in claim 1 wherein means are provided for applying said adhesive to the upper and lower faces of the folded liner material.

5. The machine defined in claim 1 wherein means are provided for applying said adhesive to opposite ends of the segment to be cut from the web to form a liner.

6. The machine defined in claim 1 wherein means are provided for clamping said leading edge against the platen during rearward travel of the feeder plate.

7. The machine defined in claim 1 wherein a clamping element applies pressure to said leading edge to hold it against the platen to prevent rearward travel when the feeder plate returns to starting position.

8. The machine defined in claim 1 wherein heat-sealing means are provided for joining the free longitudinal edges of the layers of liner material after it passes said point of attachment of the feeder plate.

9. The machine defined in claim 1 wherein means are provided for imparting negative pressure to the vacuum elements during insertion of the liner.

10. A machine for lining an envelope having an opening and comprising a frame, means for supporting said envelope to receive a liner through said open end, a cam shaft journalled in the frame for driving moving parts of the machine in timed sequence and provided with cams therefor, opposed vacuum elements adjacent the envelope supporting means for opening the envelope to receive the liner, means for supporting a web of liner material formed in two layers, a reciprocating carriage on the frame and a feeder plate secured to said carriage and positioned between said layers and arranged to push the leading edge of the web into the envelope, means for joining the layers at said leading edge to form an abutment for the feeder plate to operate against, and a cutter for severing a liner from the roll after it has entered the envelope.

11. The machine defined in claim 10 wherein the liner material is a tube which is slit along one edge before insertion of the feeder plate and is thereafter re-sealed.

12. The machine defined in claim 10 wherein means are provided for applying adhesive to the liner before it enters the envelope.

13. The machine defined in claim 10 wherein means are provided for clamping said leading edge of the web against the supporting means during rearward travel of the carriage.

14. The machine defined in claim 10 wherein means are provided for imparting negative pressure to the vacuum elements during insertion of the liner.

15. A machine for lining an envelope having an opening and comprising a frame, a platen for supporting said envelope to receive a liner through said open end, a cam shaft journalled in the frame for driving moving parts of the machine and provided with cams and arms therefor, upper and lower vacuum elements adjacent the platen for opening the envelope to receive the liner, means for supporting a web of tubular liner material, a reciprocating carriage on the frame and a feeder plate attached at a point along one edge intermediate its ends to said carriage to receive the liner material and push its leading edge into the envelope, a knife for slitting an edge of the tubular liner material to allow its passage beyond said point of attachment, means for heat-sealing said leading edge to form an abutment for the feeder plate to operate against and for re-sealing the slit edge after passing said point, means for applying adhesive to the liner before it enters the envelope, and a cutter for severing a liner from the web after it has entered the envelope.

References Cited in the file of this patent
UNITED STATES PATENTS

| | | |
|---|---|---|
| 1,633,247 | Evans et al. | June 21, 1927 |
| 2,629,214 | McVey | Feb. 24, 1953 |